United States Patent [19]

Kondo

[11] Patent Number: 5,188,079
[45] Date of Patent: Feb. 23, 1993

[54] ELECTRONIC CONTROL DEVICE FOR AN INTERNAL COMBUSTION ENGINE

[75] Inventor: Katsuhiko Kondo, Himeji, Japan

[73] Assignee: Mitsubishi Denki Kabushiki Kaisha, Tokyo, Japan

[21] Appl. No.: 835,586

[22] Filed: Feb. 14, 1992

[30] Foreign Application Priority Data

Mar. 20, 1991 [JP] Japan .................................. 3-56775
Mar. 20, 1991 [JP] Japan .................................. 3-56779

[51] Int. Cl.$^5$ ............................................. F02P 5/15
[52] U.S. Cl. ................................. 123/414; 123/422; 123/423
[58] Field of Search ............... 123/414, 416, 417, 418, 123/422, 423, 612

[56] References Cited

U.S. PATENT DOCUMENTS

| | | | |
|---|---|---|---|
| 4,373,489 | 2/1983 | Yamaguchi | 123/423 X |
| 4,570,594 | 2/1986 | Egami et al. | 123/414 |
| 4,790,280 | 12/1988 | Umehara et al. | 123/422 |
| 4,951,628 | 8/1990 | Matsuoka et al. | 123/414 |

FOREIGN PATENT DOCUMENTS 58-51155 11/1983 Japan .

Primary Examiner—Willis R. Wolfe
Attorney, Agent, or Firm—Sughrue, Mion, Zinn, Macpeak and Seas

[57] ABSTRACT

An electronic control device for an internal combustion engine which comprises: means of detecting a first crank angle position, SGTT and a second crank angle position, SGTL provided at a position on advance ignition angle side of the first crank angle position; means of calculating and setting the target ignition timing at every SGTL; means of determining a restriction time corresponding with a time interval between the SGTT and a target ignition timing when the target ignition timing is set at a timing on retarded ignition angle side of the SGTT; means of determining whether an ignition is generated after the restriction time elapses; and means of forcibly generating the ignition signal when the ignition is determined not to be generated.

2 Claims, 5 Drawing Sheets

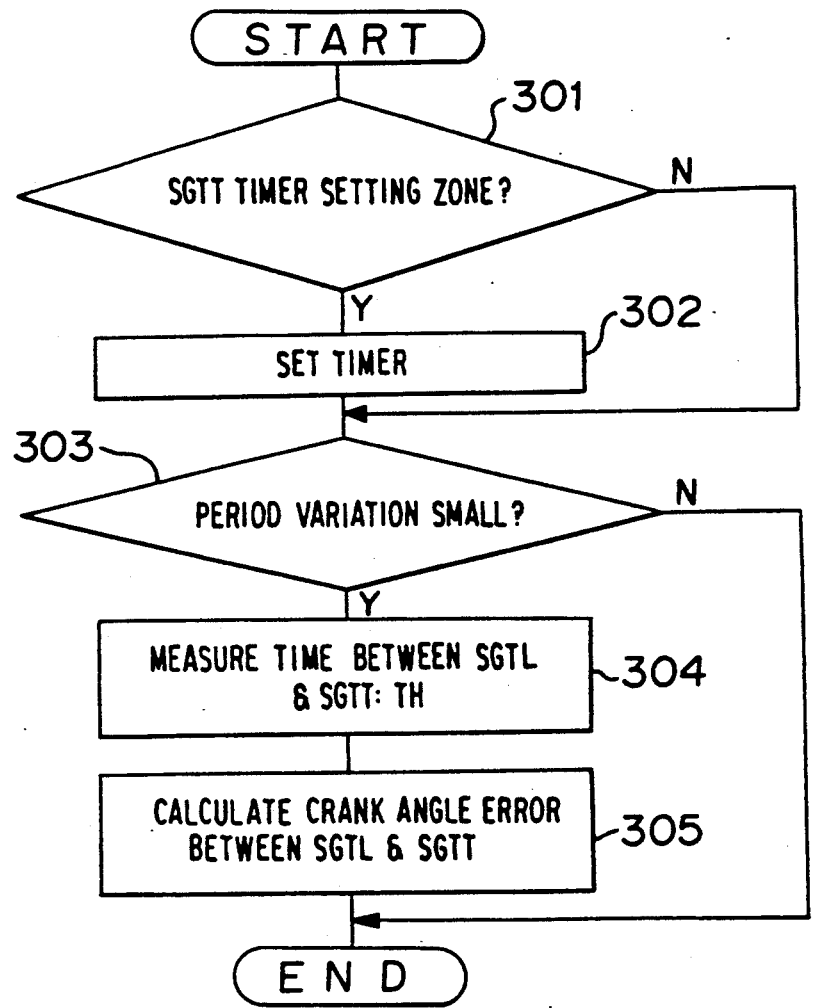
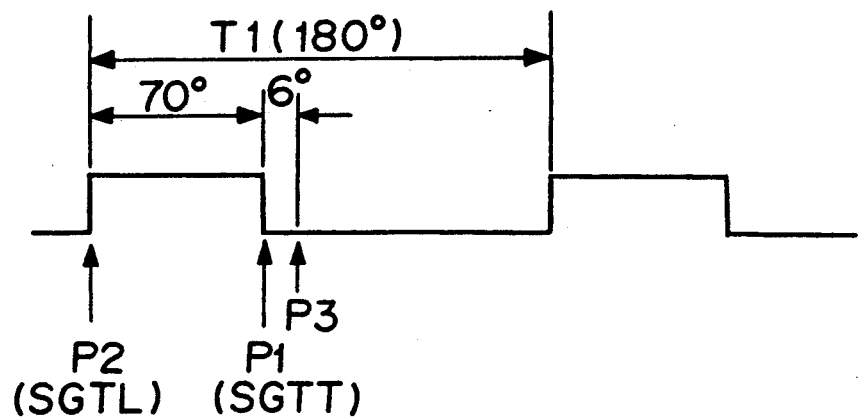

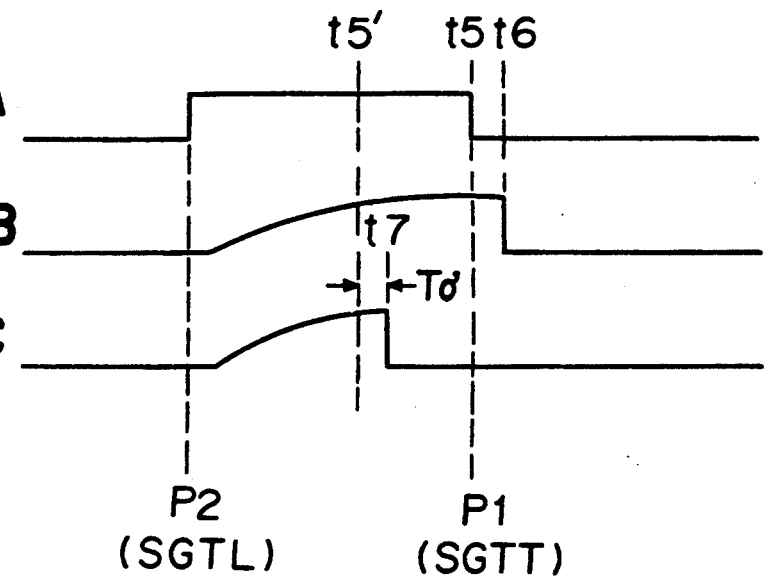
FIGURE 5A
FIGURE 5B
FIGURE 5C
FIGURE 8
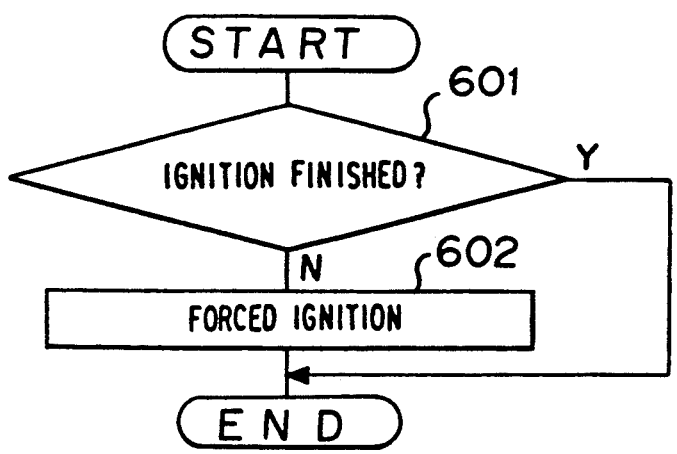

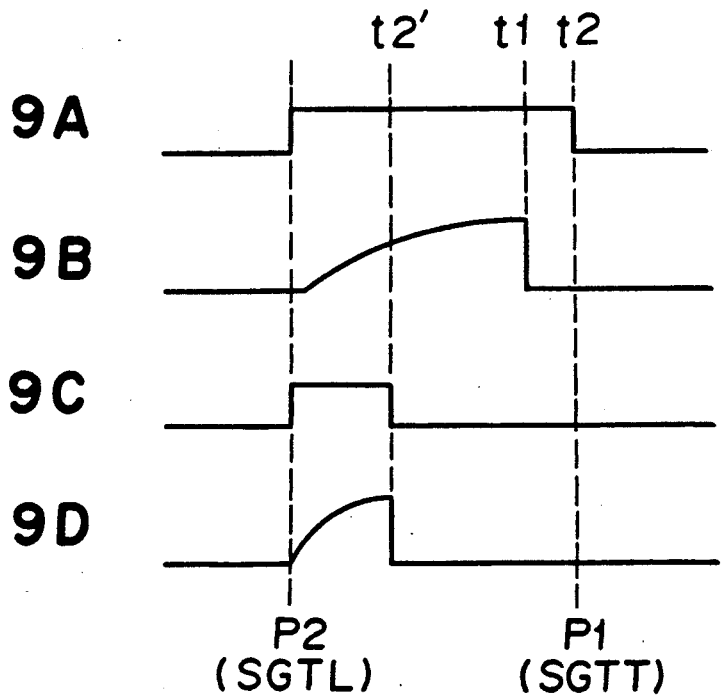
FIGURE 9A
FIGURE 9B
FIGURE 9C
FIGURE 9D
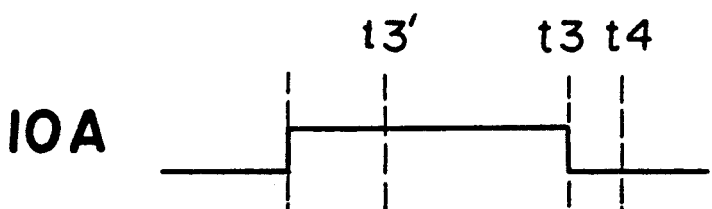
FIGURE 10A
FIGURE 10B
FIGURE 10C
FIGURE 10D

ELECTRONIC CONTROL DEVICE FOR AN INTERNAL COMBUSTION ENGINE

BACKGROUND OF THE INVENTION

1. Field of the Invention

This invention relates to an electronic control device for an internal combustion engine which detects a first crank angle position SGTT and a second crank angle position SGTL on the side of advance ignition angle of SGTT, calculates a target ignition timing at every SGTL, and sets the target ignition timing at every SGTL or at every SGTT depending on a condition of the setting.

2. Discussion of Background

Conventionally, the electronic control device of this kind, obtains a crank angle signal from a crank angle sensor provided in an internal combustion engine (hereinafter, simply engine) as shown in FIG. 4 taking an example of a four cylinder engines. A pulse-like electric signal as shown in FIG. 4 is obtained from the crank angle sensor at every half revolution (180°) of a crankshaft. P1 shown in FIG. 4 is a detection point of the first crank angle position SGTT, and P2 provided on the side of advance ignition angle of P1, a detection point of the second crank angle position SGTL. In FIG. 4, P3 designates a top dead center of the engine, and in this example, SGTT is set at 6° before the top dead center, and SGTL, 76° before the top dead center.

Furthermore, the above mentioned electronic control device measures a detection period T1 of SGTL from the crank angle signal, and calculates and sets the target ignition timing at every SGTL by determining an ignition timing optimum in running condition of the engine, based on an intake air quantity obtained from signals of revolution number of the engine calculated by the period T1, and an air-flow sensor.

When the target ignition timing is set on the side of retarded ignition angle of SGTT, abnormal retarded ignition angle or abnormal advance ignition angle may be generated by rapid acceleration or by rapid deceleration of the engine, respectively. To prevent this abnormality, when the target ignition timing is set on the side of retarded ignition angle of SGTT, the target ignition angle may be set by SGTT, and not by SGTL.

FIG. 9A signifies the above-mentioned crank angle signal, and FIG. 9B, an ignition signal. In this example, the target ignition timing is set on the side of advance ignition angle of SGTT, and the ignition is performed when time elapsed from SGTL reaches a setting timing P1 which corresponds with the target ignition timing.

At this occasion, when a detection timing t2 of SGTT is abruptly changed to t2' as shown in FIG. 9C by rapid acceleration, since the successive ignition is performed at the timing of t1, the ignition timing is abnormally retarded, and misfire of the engine may be caused. Accordingly, in the conventional case, when the target ignition timing is set on the side of advance ignition angle of SGTT, and when the rapid acceleration takes place, the ignition is performed at the detection timing t2' detecting SGTT as shown in FIG. 9D, so that the ignition timing is not retarded abnormally.

As the electronic control device of this kind, for instance, "an electronic ignition control device for an internal combustion engine" shown in Japanese Examined Patent Publication No. 51155/1983, or the like is pointed out.

However, when the target ignition timing is set at every SGTL or at every SGTT depending on the setting condition as mentioned above, if a detection error is generated between SGTL and SGTT which are detected by the crank angle sensor, the target ignition timing is deviated.

Accordingly, when adjustment is made by SGTT as a reference, the detection point of SGTL is deviated by an error portion. Therefore when the target ignition timing is set from SGTL, that is, when a timer is set for generating the ignition signal from the detection point of SGTL, the target ignition timing is deviated. Furthermore, when adjustment is made by SGTL as a reference, the detection point of SGTT is deviated by an error portion. Therefore, when the target ignition timing is set from SGTT, that is, when a timer for generating the ignition signal is set from the detection point of SGTT, the target ignition timing is deviated.

Furthermore, if the crank angle sensor is finely worked so that it detects accurately, measurement error between SGTL and SGTT can be dispensed with. However, it becomes an very expensive one.

Furthermore, in the conventional electronic control device of the engine, it is possible to prevent the abnormal retarded ignition angle by rapid acceleration in the case when the target ignition timing is set on the side of advance ignition angle of SGTT. However, as for the abnormal retarded ignition angle by rapid acceleration in the case when the target ignition timing is set on the side of retarded ignition angle of SGTT, no counter measure is provided to prevent the abnormality.

When the ignition is performed at a timing t4 on the side of retarded ignition angle of SGTT, as shown in the crank angle signal and the ignition signal of FIGS. 10A and 10B, respectively, and when the detection timing t3 of SGTT is abruptly changed to t3' by rapid acceleration as shown in FIG. 10C, the successive ignition is performed at the timing of t4 as shown in FIG. 10D, the ignition timing is abnormally retarded and misfire of the engine may be caused.

SUMMARY OF THE INVENTION

It is an object of the present invention to solve of the above problems. The target ignition timing is corrected in the above-mentioned electronic control device, based on a detected time interval between SGTL and SGTT.

Furthermore, a restriction time is determined in the electronic control device, corresponding with a time interval (TM in FIGS. 10A to 10D) between SGTL and the target ignition timing, the electronic control device determines whether the ignition signal is generated after the restriction time elapses from the actual detection of SGTT, and forcibly generates the ignition signal when the ignition signal is not generated in the restriction time.

Therefore, according to the present invention, when a detection error is generated between SGTL and SGTT, the target ignition timing which is set at every SGTL or at every SGTT, is corrected based on a time interval between detection timings of SGTL and SGTT.

Furthermore, according to the present invention, when the target ignition timing is set on the side of retarded ignition angle of SGTT, the ignition signal is forcibly generated when the ignition signal is not generated after the restriction time elapses from when SGTT is actually detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flow chart showing a treatment performed in synchronism with SGTT in the electronic control device;

FIG. 4 is a diagram showing a crank angle signal;

FIGS. 5A, 5B and 5C are timing charts showing a characteristic operation of the electronic control device of FIG. 1;

FIG. 8 is a flow chart showing a timer interruption treatment;

FIGS. 9A, 9B, 9C and 9D are timing charts for explaining an operation for preventing of abnormal retardation of ignition angle by rapid acceleration when the target ignition timing is set on the side of advance ignition angle of the conventional electronic control device; and FIG. 10A, 10B, 10C and 10D are timing charts for explaining an abnormal retarded ignition angle which caused by rapid acceleration, when the target ignition timing is set on the side of retarded ignition angle of SGTT.

DETAILED DESCRIPTION OF THE PREFERRED EMBODIMENTS

A detailed explanation will be given to an electronic control device for an internal combustion engine according to the present invention as follows.

Figure 1:
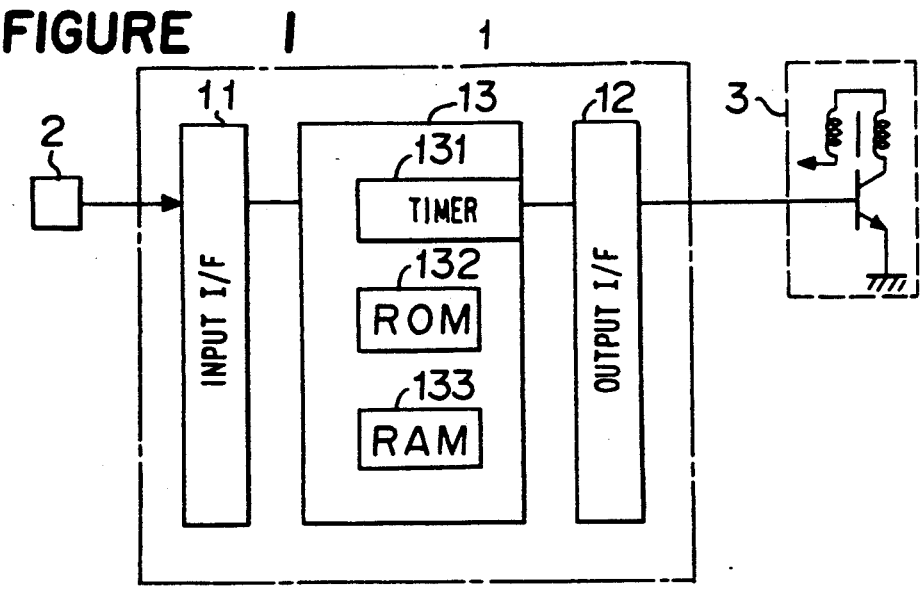
FIG. 1 is a block diagram showing an Example of an electronic control device for an internal combustion engine according to the present invention.

FIG. 1 is a block diagram showing an Example of the electronic control device. In FIG. 1, a reference numeral 1 designates a control device, 2, a crank angle sensor, and 3, an ignition device. The control device 1 is composed of an input interface 11, an output interface 12 and a microcomputer 13. The input interface 11 shapes a signal from the crank angle sensor 2, and outputs it to the microcomputer 13 as the crank angle signal as shown in FIG. 4. The output interface 12 receives an ignition signal from the microcomputer 13, and drives the ignition device 3. The microcomputer 13 is a will-known one, which includes a timer 131, a ROM 132 and a RAM 133.

Figure 2:
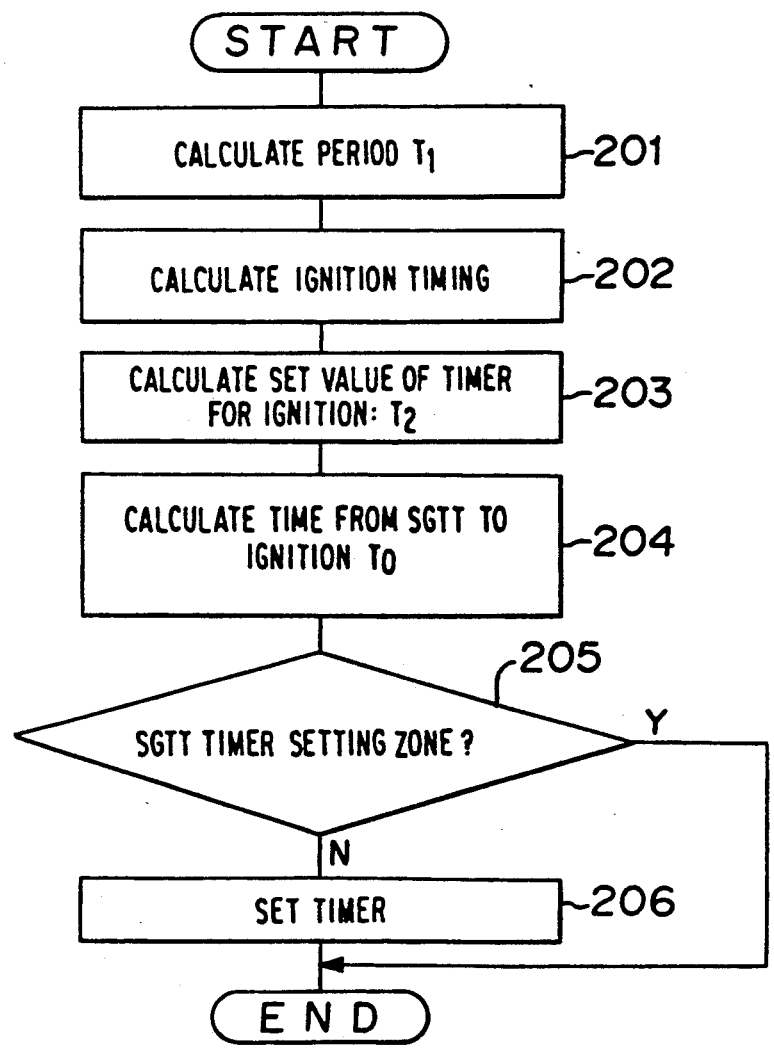
FIG. 2 is a flow chart showing a treatment performed in synchronism with SGTL in the electronic control device.

FIGS. 2 and 3 are flow charts showing function of the microcomputer 13.

The microcomputer 13 performs steps shown in FIG. 2 in synchronism with the crank angle signal SGTL. First, in step 201, the operation measures a period T1 of SGTL. The operation goes to step 202, looks up maps by revolution number obtained from the period T1 and the intake air quantity obtained by a signal from an air-flow sensor (not shown), and obtains an ignition timing which is optimum in running condition of the engine, as the target ignition timing. Furthermore, the operation goes to step 203, and calculates a set value of timer for ignition T2. T2 which is a time interval from SGTL to the target ignition timing, is calculated by the following equation (1) in case that adjustment is performed with respect to the crank angle by SGTL as a reference, and the following equation (2) in case that adjustment is performed with respect to the crank angle by SGTT as a reference.

$$T2 = T1 \times (76° - \theta)/180° \quad (1)$$

$$T2 = T1 \times (76° + \alpha - \theta)/180° \quad (2)$$

where $\theta$ is angle from the top dead center to the target ignition timing, which is positive (+) on the side of the advance ignition angle, and negative (−) on the side of retarded ignition angle. Furthermore, in the above equations, $\alpha$ denotes an detection error (crank angle error) between SGTL and SGTT, which is a value obtained by a treatment performed in synchronism with SGTT, mentioned later. When the adjustment with respect to the crank angle is performed by SGTL as a reference, the detection error $\alpha$ is not in the equation (equation (1)). When the adjustment is performed with respect to the crank angle by SGTT as a reference, the detection error $\alpha$ is included in the equation (equation (2)).

Next, the operation goes to step 204 and calculates a timer setting value T0 which is set at the detection point of SGTT when the target ignition timing is set on the side of retarded ignition angle of SGTT, by the following equation (3) in case that adjustment is performed with respect to the crank angle by SGTL as a reference, and by the equation (4) in case that the adjustment is performed with respect to the crank angle by SGTT as a reference.

$$T0 = T1 \times \theta 1/180° \quad (3)$$

$$T0 = T1 \times \theta 1/180° \quad (4)$$

where $\theta 1$ in equation (3) is $6° - \alpha - \theta$ when $6° - \alpha - \theta > 0$, and 0° when $6° - \alpha - \theta \leq 0$, and $\theta 1$ in equation (4), is $6° - \theta$ when $6° - \theta > 0$, and 0° when $6° - \theta \leq 0$.

In this case, when the adjustment is performed with respect to the crank angle by SGTL as a reference, the error $\alpha$ is included in the equation (equation (3)), and the error $\alpha$ is not included in the equation (equation (4)) when the adjustment is performed with respect to the crank angle by SGTT as a reference.

Furthermore, the operation goes to step 205, and determines whether the operation is in a zone wherein the setting of the target ignition timing is performed based on SGTT, or whether the operation is in a zone wherein the set value of the timer T0 is to be set to the timer 131 at the detection point of SGTT. That is to say, the operation determines whether the target ignition timing is on the side of retarded ignition angle ($\theta 1 > 0$) of SGTT, and whether the operation is in a zone of running condition of the engine wherein a variation of period of the crank angle signal is considerable, and the actual ignition timing is considerably deviated from the target ignition timing in case that the timer is set from STGL.

When the operation in the zone, the treatment is finished. When the operation is out of the zone, the operation goes to step 206, and sets the setting value of the timer T2 to the timer 131, by which the timer 131 outputs the ignition signal after the time T2 elapses from the detection point of SGTL.

By the way, the period T1 utilized in equations (1) to (4), may be a period added with a correction considering the variation of period.

Next, the microcomputer 13 performs steps shown in FIG. 3 in synchronism with the crank angle signal SGTT. First, in step 301, the operation determines whether the operation is in a "SGTT timer setting zone". The SGTT timer setting zone mentioned here is the same with the zone explained in step 205 of FIG. 2. If the operation is not in this zone, the operation goes to step 303. When the operation is in the zone, the operation goes to step 302. In step 302, the operation sets the setting value of timer T0 which is obtained by the equation (3) or equation (4), to the timer 131, by which the timer 131 outputs the ignition signal after the time T0 elapses from the detection point of SGTT.

In step 303, the operation determines whether there is a variation of period. That is to say, the operation calculates a variation of the period between SGTLs, between the preceding time and the current time, and determines that the variation of period does not take place when the variation is a predetermined value or below. When there is a variation of period, the treatment is finished, and if not, the operation goes to step 304. In step 304, the operation calculates a detection timing interval TH between SGTL and SGTT. Furthermore, the operation goes to step 305 and calculates a detection error between SGTL and SGTT that is, a crank angle error α by the following equation (5). This crank angle error α is utilized in the STGL synchronization treatment.

$$\alpha = (TH/T1) \times 180° - 70° \qquad (5)$$

Next, explanation will given to another embodiment of the present invention as follows.

Figure 6:
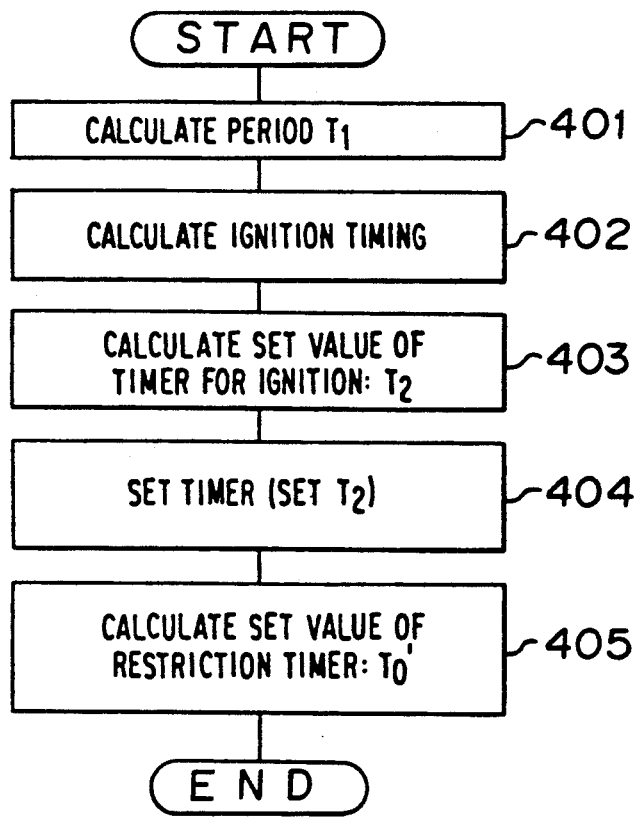
FIG. 6 is a flow chart showing a treatment performed in synchronism with SGTL in the electronic control device.
Figure 7:
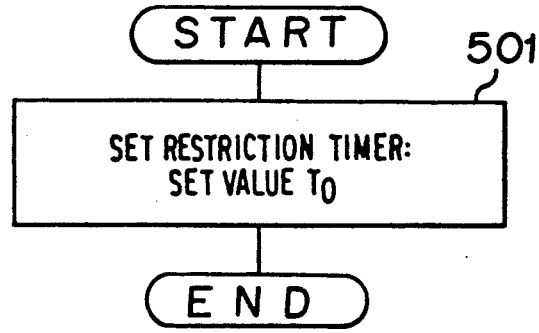
FIG. 7 is a flow chart showing a treatment performed in synchronism with SGTT of the electronic control device.

FIGS. 6 to 8 are flow charts for explaining function of the microcomputer 13.

The microcomputer 13 performs steps shown in FIG. 3 in synchronism with the crank angle signal SGTL. First, in step 401, the operation calculates a period T1 of SGTL. The operation goes to 402, and looks up maps by a revolution number obtained from the period T1, and the intake air quantity obtained by a signal from an air-flow sensor (not illustrated), and obtains an ignition timing which is optimum in running condition of the engine, as a target ignition timing. The operation goes to 403, and calculates a setting value of the timer for ignition T2. The operation calculates the time from SGTL to the target ignition timing T2 by the following equation (6).

$$T2 = T1 \times (76° - \theta)/180° \qquad (6)$$

where θ is an angle from the top dead center to the target ignition timing, which is positive (+) on the side of advance ignition angle, and negative (−) on the side of retarded ignition angle.

Next, the operation goes to step 404, and set the time T2 obtained in the preceding step 403, to the timer 131, by which the timer 131 outputs the ignition signal after the time T2 elapses from the detection point T2 of SGTL.

Furthermore, the operation goes to step 405, and calculates the setting value of the timer (restriction timer) T0' by the following equation (7), to restrict the ignition timing from being retarded. This restriction time T0' is set to the timer 131 in synchronism with the crank angle signal SGTT.

$$T0' = T1 \times A/180° + \alpha' \qquad (7)$$

where A is $6° - \theta$ when $6° - \theta > 0$ and 0° when $6° - \theta \leq 0$. Furthermore, in equation (7), α' denotes a very little time which is pertinently determined.

The period T1 which is utilized in equations (6) and (7), is a period corrected considering a variation of the period.

Next, the microcomputer 13 performs steps shown in FIG. 7 in synchronism with the crank angle signal SGTT. The operation sets the restriction time obtained in step 405 to the timer 131 (step 501), by which the timer 131 generates an interruption signal after a time interval T0' elapses from the detection point T1 of SGTT.

When the timer 131 generates the interruption signal, the microcomputer 13 determines in synchronism with the interruption signal, firstly whether the ignition is finished, following the flow chart shown in FIG. 8 (step 601). That is to say, the operation confirms whether the ignition signal is generated, and finishes the treatment if the ignition signal is generated. If the ignition signal is not generated, the operation determines that the crank angle signal changes rapidly (rapid acceleration), and forcibly generates the ignition signal in step 602, by which the operation prevents an abnormal retarding of the ignition angle.

When the ignition is performed at the timing t6 on the side of the retarded ignition angle of SGTT, as shown in the crank angle signal and the ignition signal of FIGS. 5A and 5B, respectively, when a detection timing t5 of SGTT is rapidly changed to t5' by rapid acceleration, as shown in FIG. 5C, the ignition is performed forcibly at t7 after the time T0' elapses from t5', thereby preventing an abnormal retardation of ignition angle.

As is the apparent in the above explanation, according to the present invention, when the detection error is caused between SGTL and SGTT, the target ignition timing which is set at every SGTL or at every SGTT, is corrected based on the detection time interval between SGTL and SGTT, and the ignition timing is accurately controlled without requiring a severe accuracy in the crank angle sensor.

As apparent in the above explanation, according to the present invention, when the target ignition timing is set on the side of retarded ignition angle of SGTT, and when ignition signal is not generated after a restriction time elapses from when SGTT is actually detected, the ignition signal is forcibly generated, by which an abnormal retardation of ignition angle due to a rapid acceleration is prevented when the target ignition timing is set on the side of the retarded ignition angle of SGTT.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic control device for an internal combustion engine which comprises:

means of detecting a first crank angle position (SGTT) and a second crank angle position (SGTL) provided at a position on advance ignition angle side of the first crank angle position;

means of calculating a target ignition timing at every SGTL;

means of setting the target ignition timing at every SGTL or at every SGTT depending on a setting condition; and means of correcting the target ignition timing based on a time interval between a first detecting timing of the SGTL and a second detecting timing of the SGTT.

2. An electronic control device for an internal combustion engine which comprises:

means of detecting a first crank angle position (SGTT) and a second crank angle position (SGTL) provided at a position on advance ignition angle side of the first crank angle position;

means of calculating and setting the target ignition timing at every SGTL;

means of determining a restriction time corresponding with a time interval between the SGTT and a target ignition timing when the target ignition timing is set at a timing on retarded ignition angle side of the SGTT;

means of determining whether an ignition is generated after the restriction time elapses; and means of forcibly generating the ignition signal when the ignition is determined not to be generated.

* * * * *